United States Patent [19]
Stagl et al.

[11] Patent Number: 5,356,108
[45] Date of Patent: Oct. 18, 1994

[54] WEIGHTED TROPHY BASE

[75] Inventors: Peter M. Stagl, Morris Plains; Robert Hedrick, Dix Hills, both of N.J.

[73] Assignee: Avnet, Inc., Great Neck, N.Y.

[21] Appl. No.: 87,390

[22] Filed: Jul. 2, 1993

[51] Int. Cl.$^5$ ............................................. F16M 13/00
[52] U.S. Cl. ................... 248/346; 248/910; 248/188.1
[58] Field of Search ............... 248/346, 910, 504, 506, 248/188.9, 678, 679, 188.1, 519, 158, 688; 428/542.4

[56] References Cited

U.S. PATENT DOCUMENTS

| | | | |
|---|---|---|---|
| 1,270,004 | 6/1918 | Chappell | 248/910 X |
| 1,631,227 | 6/1927 | See | 248/188.1 X |
| 2,123,420 | 7/1938 | Hiser | 248/346 X |
| 2,634,934 | 4/1953 | Martin et al. | 248/158 |
| 3,027,670 | 4/1962 | Kramer et al. | 248/159 X |
| 3,352,522 | 11/1967 | Bogosh | 248/158 |
| 3,415,475 | 12/1968 | Goodman | 248/910 X |
| 4,219,176 | 8/1980 | Weiss | 248/910 X |
| 4,323,630 | 4/1982 | Mackey et al. | 248/158 X |
| 4,530,504 | 7/1985 | Long, Jr. | 248/346 X |

FOREIGN PATENT DOCUMENTS 0670360  4/1952  United Kingdom ............... 248/910

*Primary Examiner*—Karen J. Chotkowski
*Attorney, Agent, or Firm*—Darby & Darby

[57] ABSTRACT

An improved weighted base for a trophy, includes a cup-shaped shell having a platform for supporting portions of the trophy above the base. A cover having a surface for resting on a table, shelf and the like is connected to the shell to define a hollow interior cavity. A fill hole in the cover provides access to the cavity and a funnel extends from the fill hole to provide a flow path into the cavity. A cross section of the flow path in the funnel is larger proximate the funnel outlet end than proximate the fill hole. Hardened filler in the base, which filler was introduced to the cavity in fluid form via the fill hole and funnel, increases the weight of the base. A vent opening connects the cavity with the external environment during filling of the base. Narrowing the funnel near the fill hole reduces loss of filler should the filler fracture in the base.

18 Claims, 1 Drawing Sheet

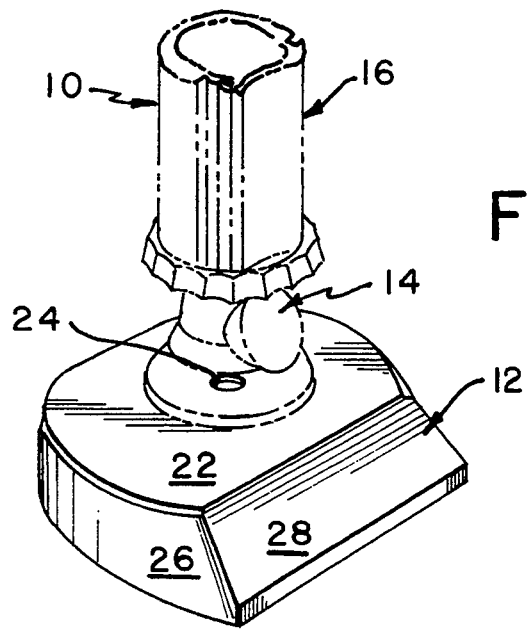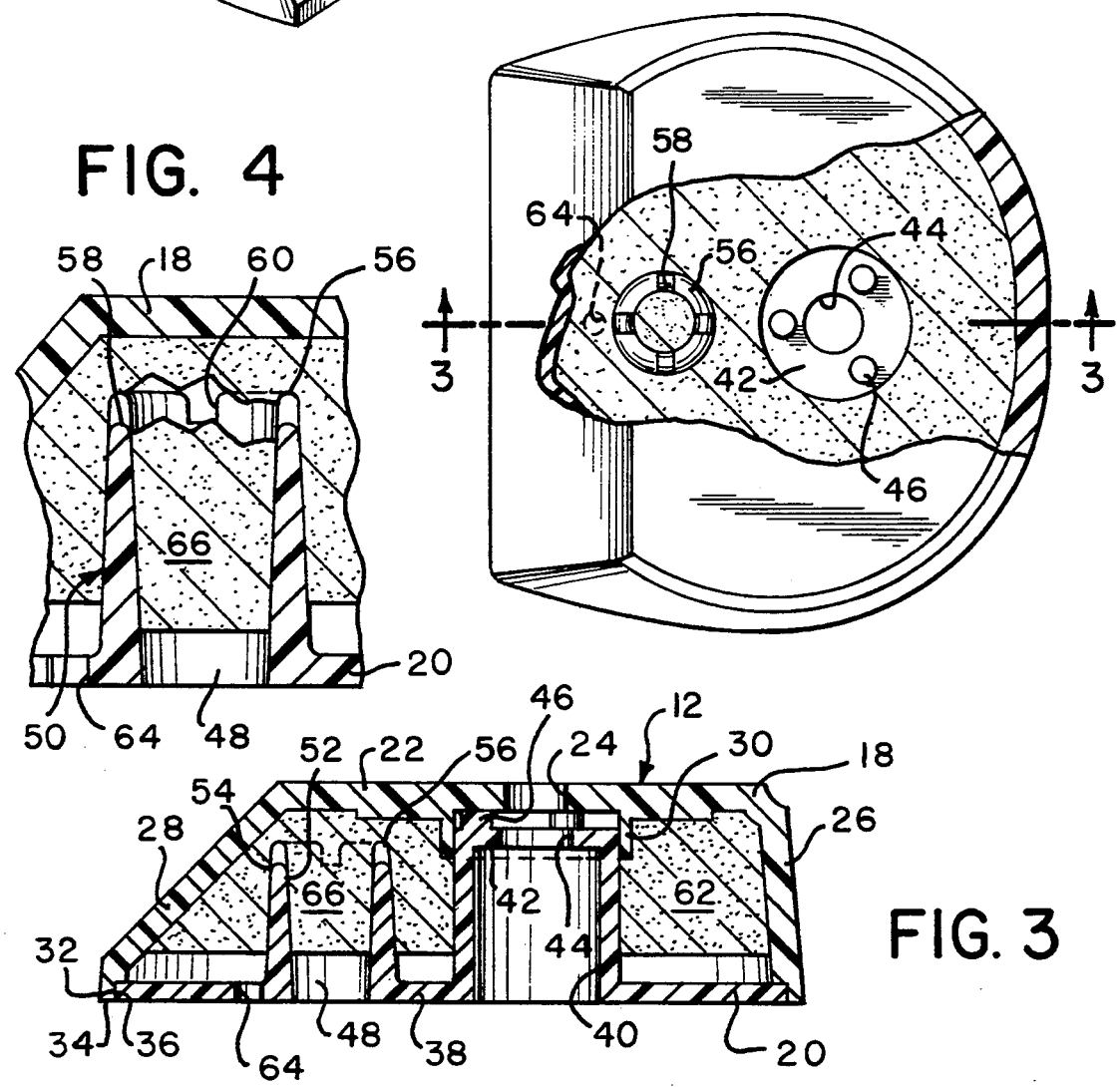

WEIGHTED TROPHY BASE

BACKGROUND OF THE INVENTION

Trophies are given as awards on many occasions. Frequently they are the prize in a contest, an athletic event, an academic event or an intellectual competition such as spelling bees and chess matches, for example. Prestigious events warrant prestigious trophies, which may be made of or coated with metal, perhaps precious or semi-precious, and marble. However, the need for such prestigious trophies is limited. On the other hand, the need for more commonplace awards expands rapidly as the cost of producing trophies is reduced. Success in reducing production costs of trophies now makes trophies readily available, for example, for tots in day school, players in day camps, and for more adult performers who engage in such activities as corporate bowling, softball and basketball leagues, and the like, all of which are very familiar.

A large measure of the success in reducing trophy cost has resulted from constructions employing plastic parts in place of natural products such as metal, stone and marble. However, in substituting these man-made materials for the natural materials, there has been a desire and an effort to have the trophies give the appearance and feel of natural materials. Thus, a gold-plated, brass or bronze figure may now be replaced with a metalized plastic figure. A base which had been made of stone or marble can now be replaced with one that is made of plastic and fabricated to give the appearance of the natural material.

However, a problem arises in that most trophies have a vertical orientation and sit on a shelf or platform. To provide the feel or heft of a trophy made of natural materials, and also to provide stability for a standing trophy, it is necessary that the plastic bases used in the less expensive trophies be weighted.

Weighting has been accomplished by filling a hollow plastic base with an initially fluid material, for example, gypsum or hydrostone, which is a naturally occurring product having physical properties similar to that of cement. The base is filled with the fluid material through a fill hole. After the material hardens, the base takes on the feel of natural stone or marble.

However, a problem has developed in that uncontrolled material flow during filling of the base allows internal splashing and resultant thinned-out portions at the perimeter of the filler. Then shocks to the base have caused breakage of the internal cement-like material. As a result, particles of cement have been known to break off and fall from the fill hole. This is objectionable to those who sell trophies as well as to those who receive and keep trophies. The trophy seems to be "cheapened" to those who buy and those who receive the trophy.

What is needed is a filled trophy base, using artificial materials, that has the feel of natural stone or marble, suppresses formation of particles during filling and does not release hardened particles of the fill material.

SUMMARY OF THE INVENTION

Accordingly, it is an object of the invention to provide an improved trophy base having a hollow interior which is filled with a cement-like material to simulate the heft of natural stone or marble.

It is another object of the invention to provide an improved weighted trophy base having a hollow interior that is filled with material that is retained in the base after shocks and impacts have caused breakage of the filled material.

An improved weighted base for a trophy includes a cup-shaped shell having a platform for supporting portions of the trophy above the base. A cover having a surface for resting on a table, shelf and the like is connected to the shell to define a hollow interior cavity. A fill hole in the cover provides access to the cavity and a funnel extends from the fill hole to provide a flow path into the cavity. The funnel controls filler flow into the cavity and limits splashing. A cross section of the flow path in the funnel is larger proximate the funnel outlet end than proximate the fill hole. Hardened filler in the base including a filler plug formed in the funnel, which filler was introduced to the cavity in fluid form via the fill hole and funnel, increases the weight of the base. A vent opening connects the cavity with the external environment during filling of the base. Narrowing the funnel near the fill hole prevents loss of the plug should it separate from the main body of hardened fill material and the plug reduces loss of filler should the main body of filler fracture within the base.

Further objects and advantages of the invention will be apparent from the following detailed description and drawings. The invention, accordingly, comprises the features of construction, combination of elements, and arrangement of parts which will be exemplified in the construction hereinafter set forth, and the scope of the invention will be indicated in the claims.

BRIEF DESCRIPTION OF THE DRAWINGS

For a full understanding of the invention references is had to the following description of a presently preferred embodiment, taken in connection with the accompanying drawings, in which:

FIG. 1 is a partial top perspective view of a trophy in accordance with the invention;

FIG. 2 is a partially sectioned top view of the base of the trophy of FIG. 1;

FIG. 3 is a sectional elevational view of the base taken along the line 3—3 of FIG. 2; and FIG. 4 is an enlarged fragment of FIG. 3 taken near the base fill hole.

DESCRIPTION OF THE PREFERRED EMBODIMENT

With reference to the Figures, a trophy 10 includes a base 12, riser 14 and column 16. Those skilled in the art of trophies will understand that the column 16 is topped with further elements, generally including a figurine (not shown).

The base 12 is fabricated of molded plastic and filled to give the weight and heft of a marble or stone base. A hollow interior for the base is provided by a shell 18 and a cover 20. The shell 18 has a flat upper surface or platform 22 on which the riser 14 rests. An opening 24 in the upper surface 22 allows passage therethrough of a bolt (not shown) of extended length that is conventionally used in trophies to connect the topmost figurine to the base 12. The bolt passes through all of the central elements of the trophy including the riser 14 and column 16 to engage the figurine.

Peripheral walls or surfaces 26 depend from the upper surface 22 such that a generally hollow cup is formed with the surface 22, albeit inverted in the finished trophy.

The wall 26 extends substantially two-thirds of the distance around the shell 18 and the sloping surface 28 forms a front face on which a small engraved plaque can be placed if desired. The shape of the base 12 may have many variations, for example, round, square, rectangular, oval, etc. as seen in a plan view (FIG. 2). The shape is not a novel portion of the present invention and accordingly, further configurations are not described herein.

On the underside of the platform 22, an annular ring 30 surrounds the opening 24 and extends into the interior of the hollow base 12.

The cover 20 has a periphery 32 that corresponds to the lower periphery 34 of the shell 18. A notch 36 formed along the periphery 34 of the shell 18 nests the cover 20, and the lower surface 38 of the cover 20 is substantially flush with the lower peripheral edge 34 of the shell 18.

A cylindrical boss 40 extends from the lower plate 38 of the cover 20 toward the platform 22 of the shell 18 and nests within the annular ring 30. A top 42 of the boss 40 has a central opening 44 that is in alignment with the opening 24 in the shell 18. Circular stops 46 extend above the top 42 of the boss 40 so that upon assembly of a cover 20 to a shell 18, the stops 46, three are illustrated, limit insertion of the boss 40 into the annular ring 30 of the shell 18 by abutment with the underside of the platform 22.

In a completed trophy that is assembled with a through bolt, as discussed above, a nut, which is recessed in the hollow of the boss 40, is tightened to the threaded end of the bolt. This is a conventional construction for trophies.

A fill hole 48 through the plate 38 of the cover 20 opens into a funnel 50 that is generally a cylinder extending from the fill hole 48. The inner wall 52 of the funnel 50 is tapered such that the flow area of the funnel increases with the distance from the fill hole 48. The outer wall 54 of the funnel 50 is cylindrical although it is not so limited.

The top of the funnel 50, as it is illustrated in FIGS. 3, 4 is crenellate and the uppermost extremities 56 of the crenellations are rounded in profile (FIG. 4). The indented portions 58 also have rounded surfaces. Four indented portions are illustrated (FIG. 2). The indented portions 58 are formed with perpendicular edges 60 and intersections between these perpendicular edges and the uppermost extremities 56 of the funnel are also rounded.

In assembling the base 12, the cover 20 is nested into the peripheral notch 36 of the shell 18 and the outside surface of the boss 40 is press-fitted within the annular ring 30 of the shell 18. The assembled components 18, 20 are inverted so that the platform 22 is down and the fill opening 48 is at the top. Then, a fluidized filler material, that subsequently hardens into a cement-like mass 62, for example, gypsum, is poured into the funnel 50 via the opening 48 until a desired level of cement is achieved. As the cement enters and fills the hollow cavity of the base 12, air is vented through a vent hole 64.

The funnel 50, by its extension toward the shell 18, controls the inflow of liquid filler and thereby attenuates the incidence of splash that in the prior art causes thinned out portions of filler at the perimeter of the hollow base.

The press fit between the boss 40 and the annular ring 30 prevents leakage of fluid cement from the interior of the base when the fluid cement is poured through the funnel 50. The stops 46 on top of the boss 40 provide centralized support and assure that the upper surface or platform 22 of the base 12 will be substantially flat.

After the filler has hardened, the base is inverted and the trophy can be assembled conventionally. The funnel 50 aids in supporting the main body of hardened filler in the position where it was poured after inversion of the base 12, as illustrated in FIG. 3. The most vulnerable region for breakage of the cast filler in the event of unintended shocks and impacts is at the top of the funnel 50 where thickness of the cement is reduced. However, the crenellated top of the funnel provides more surface for engagement between the cement 62 and the cover 20. The rounded surfaces 56, 58 and also the rounded surfaces at the intersections of the edges 60 and the uppermost extremities 56 of the funnel 50 reduce stresses when compared to sharp non-rounded intersections. The rounded surfaces reduce the hazard of breakage in this region.

However, if breakage should occur in the cement 62, as illustrated in FIG. 4, the loose gypsum plug 66, which has broken from the primary mass 62, is retained in the funnel 50 by the reverse taper on the inner wall 52. Further, the crenellated top of the funnel 50 provides ribs of filler material that extend from the main mass 62 to the plug portion 66 within the funnel, and strengthen this connection between them.

Additionally, the presence of the plug 66 in the funnel 50, whether integral with or broken from the main body of filler, blocks the funnel and acts to prevents other particles that may generate in the base 12 from escaping through the fill hole 48.

The taper in the funnel may vary in a wide range. An opening angle within the conical funnel in the range of approximately 1° to 30° is preferred but is not so limited.

An inwardly extending collar (not shown) on the cover 20 within the hollow base 12 and around the vent hole 64 may be used to further inhibit the escape of any loose filler particles from the base 12.

Although, a tapered funnel is described and illustrated, it should be understood that the invention is not so limited. Any reduction in cross-section of the filler flow path that prevents the plug 66, when separated from the main body 62 of hardened filler, from falling out of the fill hole 48 may be used.

It will thus be seen that the objects set forth above, and those made apparent from the preceding description, are efficiently attained and since certain changes made be made in the above construction without departing from the spirit or the scope of the invention, it is intended that all matter contained in the above description, or shown in the accompanying drawings shall be interpreted as illustrative and not in a limiting sense.

What is claimed is:

1. A weighted base for a trophy that may stand on a shelf, table and the like, comprising:
    a shell having a platform for supporting portions of said trophy above said base;
    a cover having a first surface for resting on a table, shelf and the like, said cover being connected to said shell to define a hollow interior cavity of said base;
    a fill hole in said cover providing access to said cavity;
    a funnel connected to said cover and communicating with said fill hole to provide a flow path from said fill hole to said cavity, said funnel having an inlet end adjacent said fill hole and an outlet end extending into said cavity;

hardened filler means in said base, which filler means was introduced to said cavity in fluid form via said fill hole and said funnel, for increasing the weight of said base;

connective means for connecting said shell to said cover; and vent means for communicating said cavity with the external environment during filling of said base with said filler means.

2. A weighted base as in claim 1, wherein said funnel has an interior surface that is a conical segment, said flow path cross section increasing with the distance from said fill hole.

3. A weighted base as in claim 2, wherein said shell is cup-shaped and said cover nests along a periphery of said shell.

4. A weighted base as in claim 3, wherein said connective means includes a boss extending within said cavity from said cover towards said shell, and an annular ring extending within said cavity from said shell towards said cover, said boss engaging said ring with a press fit.

5. A weighted base as in claim 4, wherein said connective means further includes a through hole in said shell platform and a central hole in said boss, said through hole and central hole being aligned for receiving a through bolt used in assembling a completed trophy.

6. A weighted base as in claim 4, wherein said press fit engagement is leak tight, whereby filler material introduced into said cavity in a fluid state cannot leak at the interface between said annular ring and said boss.

7. A weighted base as in claim 2, wherein said vent means is a hole in said cover, whereby entry of fluid filler material to said cavity via said fill hole and funnel displaces air from said cavity via said vent hole.

8. A weighted base as in claim 1, wherein a cross-section of said flow path is larger proximate said outlet end than proximate said fill hole.

9. A weighted base as in claim 1, wherein said funnel outlet end includes a rounded end surface.

10. A weighted base as in claim 9, further including cutout portions in said rounded end surface.

11. A weighted base as in claim 10, wherein said cutout portions are rectangular notches, bottoms of said notches being rounded.

12. A weighted base as in claim 10, wherein said cutouts are rectangular notches, each said notch having a bottom and sides, intersections of said sides with said rounded end surface of said funnel being rounded.

13. A weighted base as in claim 1, wherein said filler means is in at least two portions, a first portion being in said cavity and a second portion being in said funnel.

14. A weighted base as in claim 13, wherein said first portion of filler means in said cavity is integral with said second portion of filler means in said funnel.

15. A weighted base as in claim 13, wherein funnel has an interior surface that is a conical segment, said flow path cross section increasing with the distance from said fill hole, and said first portion of filler means in said cavity is integral with said second portion of filler means in said funnel.

16. A weighted base as in claim 13, wherein said funnel has an outlet end surface including cutout portions.

17. A weighted base as in claim 16, wherein said first filler means portion in said cavity and said second filler means portion in said funnel are integral, said first and second portions being connected through said cutout portions of said funnel.

18. A weighted base as in claim 13, wherein said first and second portions of said filler means are separated, cross-sections of said flow path being dimensioned to prevent said second portion from leaving said funnel through said fill hole.

* * * * *